(12) United States Patent
Erivantcev et al.

(10) Patent No.: US 10,775,946 B2
(45) Date of Patent: Sep. 15, 2020

(54) UNIVERSAL HANDHELD CONTROLLER OF A COMPUTER SYSTEM

(71) Applicant: Finch Technologies Ltd., Fish Bay, Tortola (VG)

(72) Inventors: Viktor Vladimirovich Erivantcev, Ufa (RU); Alexey Ivanovich Kartashov, Moscow (RU); Daniil Olegovich Goncharov, Ufa (RU); Iakov Evgenevich Sergeev, Ufa (RU); Ravil Salavatovich Shafikov, Kumertau (RU); Kirill Alexandrovich Kastriukin, Ufa (RU); Rustam Rafikovich Kulchurin, Ufa (RU)

(73) Assignee: Finch Technologies Ltd., Fish Bay, Tortola (VG)

( * ) Notice: Subject to any disclaimer, the term of this patent is extended or adjusted under 35 U.S.C. 154(b) by 0 days.

(21) Appl. No.: 16/229,940

(22) Filed: Dec. 21, 2018

(65) Prior Publication Data

US 2020/0201460 A1   Jun. 25, 2020

(51) Int. Cl.
| | |
|---|---|
| *G01R 27/26* | (2006.01) |
| *G06F 3/044* | (2006.01) |
| *G06F 3/041* | (2006.01) |
| *G06F 3/01* | (2006.01) |
| *G06F 3/0346* | (2013.01) |

(52) U.S. Cl.
CPC ............ *G06F 3/044* (2013.01); *G06F 3/011* (2013.01); *G06F 3/017* (2013.01); *G06F 3/0346* (2013.01); *G06F 3/0416* (2013.01)

(58) Field of Classification Search
CPC combination set(s) only.
See application file for complete search history.

(56) References Cited

U.S. PATENT DOCUMENTS

| | | | |
|---|---|---|---|
| 2014/0232418 A1* | 8/2014 | Heim | G06F 1/1626 324/679 |
| 2017/0308165 A1* | 10/2017 | Erivantcev | G06F 3/017 |
| 2019/0236344 A1* | 8/2019 | Chen | G06F 3/011 |

OTHER PUBLICATIONS

Calibration of Multiple Sensor Modules Related to an Orientation of a User of the Sensor Modules, U.S. Appl. No. 16/534,674, filed Aug. 7, 2019, Alexey Kartashov, et al, Sent to Classification contractor, Aug. 20, 2019.
Capacitive sensing, Wikipedia, printed on Dec. 10, 2018.
IQS263B ProxSense IC, http://www.azoteq.com/2017-02-09-07-38-01/proxsense/11-products/151-iqs263.html, printed on Dec. 10, 2018.

* cited by examiner

*Primary Examiner* — Deeprose Subedi
(74) *Attorney, Agent, or Firm* — Greenberg Traurig (57) ABSTRACT

A handheld controller having at least one input device, a left capacitive sensor electrode mounted in a left portion of the handheld device; a right capacitive sensor electrode mounted in a right portion of the handheld device; and a microcontroller. The input device is configured to receive user inputs provided via a finger of the hand holding the handheld controller. The handheld controller is symmetric from left to right. The microcontroller is configured to determine whether the hand is a left hand or a right hand based on measurements made via the left capacitive sensor electrode and the right capacitive sensor electrode and dynamically configures the handheld controller has left-handed or right-handed based on the measurements.

20 Claims, 5 Drawing Sheets

UNIVERSAL HANDHELD CONTROLLER OF A COMPUTER SYSTEM

FIELD OF THE TECHNOLOGY

At least a portion of the present disclosure relates to computer input devices in general and more particularly but not limited to input devices for virtual reality and/or augmented/mixed reality applications implemented using computing devices, such as mobile phones, smart watches, similar mobile devices, and/or other devices.

BACKGROUND

U.S. Pat. App. Pub. No. 2014/0028547 discloses a user control device having a combined inertial sensor to detect the movements of the device for pointing and selecting within a real or virtual three-dimensional space.

U.S. Pat. App. Pub. No. 2015/0277559 discloses a finger-ring-mounted touchscreen having a wireless transceiver that wirelessly transmits commands generated from events on the touchscreen.

U.S. Pat. App. Pub. No. 2015/0358543 discloses a motion capture device that has a plurality of inertial measurement units to measure the motion parameters of fingers and a palm of a user.

U.S. Pat. App. Pub. No. 2007/0050597 discloses a game controller having an acceleration sensor and a gyro sensor. U.S. Pat. No. D772,986 discloses the ornamental design for a wireless game controller.

Chinese Pat. App. Pub. No. 103226398 discloses data gloves that use micro-inertial sensor network technologies, where each micro-inertial sensor is an attitude and heading reference system, having a tri-axial micro-electromechanical system (MEMS) micro-gyroscope, a tri-axial micro-acceleration sensor and a tri-axial geomagnetic sensor which are packaged in a circuit board. U.S. Pat. App. Pub. No. 2014/0313022 and U.S. Pat. App. Pub. No. 2012/0025945 disclose other data gloves.

U.S. Pat. App. Pub. No. 2016/0085310 discloses techniques to track hand or body pose from image data in which a best candidate pose from a pool of candidate poses is selected as the current tracked pose.

U.S. Pat. App. Pub. No. 2017/0344829 discloses an action detection scheme using a recurrent neural network (RNN) where joint locations are applied to the recurrent neural network (RNN) to determine an action label representing the action of an entity depicted in a frame of a video.

U.S. Pat. App. Pub. No. 2017/0186226 discloses a calibration engine that uses a machine learning system to extracts a region of interest to compute values of shape parameters of a 3D mesh model.

U.S. Pat. App. Pub. No. 2017/0186226 discloses a system where an observed position is determined from an image and a predicted position is determined using an inertial measurement unit. The predicted position is adjusted by an offset until a difference between the observed position and the predicted position is less than a threshold value.

U.S. Pat. App. Pub. No. 2017/0308165 discloses devices for controlling computers based on motions and positions of hands, which are measured or determined using inertial sensor units mounted in the devices.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described to avoid obscuring the description. References to one or an embodiment in the present disclosure are not necessarily references to the same embodiment; and, such references mean at least one.

At least some embodiments are directed to a universal handheld controller that can automatically adapt its application to left hand usage and right hand usage in controlling a computer model of a user in a virtual reality system, or an augmented/mixed reality system.

The exterior shape of the universal handheld controller is configured to be symmetric with respect to left and right. The user interface elements, such as a touch pad(s), buttons, LED lights, are also configured to be symmetric with respect to left and right. Since the exterior shape and exterior functional structures/user interface elements are symmetric with respect left and right, the universal handheld controller can physically be held and used in the left hand in a same way as in the right hand, in a mirror relation as the left hand relative to the right hand.

Further, the universal handheld controller is configured with a capacitive sensor assembly. The capacitive sensor assembly has a pair of capacitive sensor electrodes. A microcontroller of the capacitive sensor assembly can determine whether the universal handheld controller is being used in a left hand or a right hand, based on signals from the capacitive sensor electrodes. Based on whether the universal handheld controller is being held in a left hand or a right hand, the universal handheld controller automatically adapts itself as left-handed or right-handed. A virtual reality system, or an augmented/mixed reality system, can then use the control signals form the universal handheld controller to control the left hand or the right hand of a model of the user, as if the handheld controller were pre-configured for a left hand or a right hand. For example, two identical universal handheld controllers can be provided to a user; when the universal handheld controllers are held by the left hand and the right hand of the user, the universal handheld controllers are automatically configured as a left-handed controller and a right-handed controller respective for the left hand and the right hand, without requiring the user to adjust any settings of the universal handheld controllers.

Figure 1:
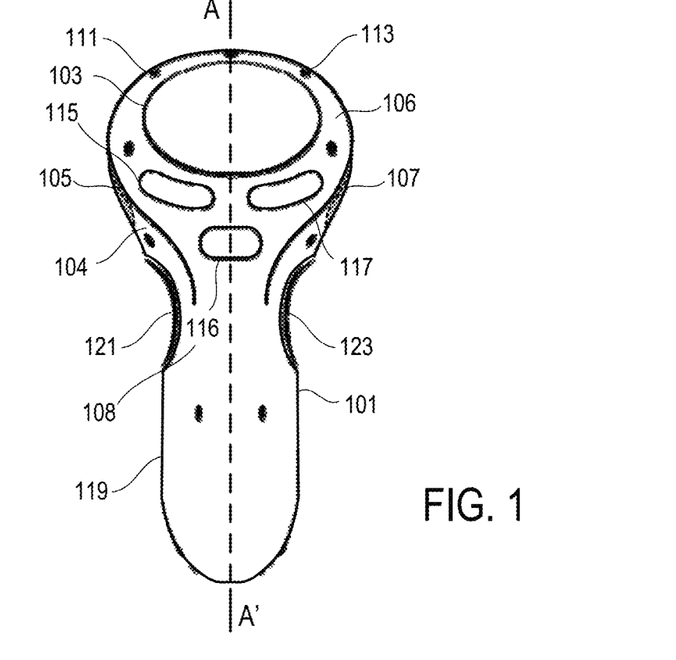
FIG. 1 illustrates a universal handheld controller having a capacitive sensor assembly configured to allow the controller to be used in either hand of a user.

FIG. 1 illustrates a universal handheld controller (101) having a capacitive sensor assembly configured to allow the controller to be used in either hand of a user.

The universal handheld controller (101) has a handle (119), a neck portion (108) having grooves (121 and 123), and a head portion (106) having user interface elements, such as LED lights (e.g., 111 and 113), a touch pad (103), and buttons (115, 116 and 117).

FIG. 1 shows a back view of the universal handheld controller (101). The exterior configuration of the universal handheld controller (101) is symmetric from left to right.

For example, the left button (115) and the right button (117) are arranged to be mirror images of each other with respect to the center plane A-A' of the universal handheld controller (101).

For example, the center button (116) is positioned and shaped to be symmetric with respect to the center plane A-A'.

For example, the touch pad (103) is symmetric with respect to the center plane A-A'.

For examples, left LED lights (e.g., 111) and right LED lights (e.g., 113) are positioned on the universal handheld controller (101) in a way that is symmetric with respect to the center plane A-A'.

The grooves (121 and 123) of the neck portion (108) are sized and positioned in the universal handheld controller (101) such that when the universal handheld controller (101) is held in a hand, the middle finger on the hand can wrap around one of the grooves (121 and 123) for a secure grip on the universal handheld controller (101).

The handle (119) is sized and positioned in the universal handheld controller (101) such that when the universal handheld controller (101) is held in a hand, the ring finger and the little finger on the hand can wrap around the handle for a secure grip on the universal handheld controller (101).

The head portion (106) is configured in the universal handheld controller (101) such that when the universal handheld controller (101) is held in a hand, the thumb on the hand can selectively touch the touch pad (103) and press on one of the push buttons (115-117).

Optionally, the touch pad (103) can be replaced with a joystick.

The head portion (106) has a middle section (104) within which capacitive sensor electrodes (105 and 107) of the capacitive sensor assembly are mounted. The middle section (104) is located between the neck portion (108) and the top of the head portion (106) where the touch pad (103) and the buttons (115-117) are located. When the universal handheld controller (101) is held in a hand, the index finger on the hand can wrap around only part of the middle section (104) of the head portion (106).

The capacitive sensor electrodes (105 and 107) are mounted inside the housing of the head portion (106). When the universal handheld controller (101) is held in a hand, the hand is not in direct contact with the capacitive sensor electrodes (105 and 107).

The capacitive sensor electrodes (105 and 107) are configured to be symmetric with respect to the center plane A-A'.

Preferably, the capacitive sensor electrodes (105 and 107) are sized, shaped and positioned in the middle section (104) of the head portion such that when a left hand is holding the universal handheld controller (101), the hand (e.g., the upper palm and/or a portion of the index finger of the left hand) wraps around the left capacitive sensor electrodes (105), but the right capacitive sensor electrode (107) is significantly further away from the hand than the left capacitive sensor electrodes (105). For example, the index finger of the left hand cannot wrap round to reach the portion of the housing that covers the right capacitive sensor electrode (107); and the tip of the index finger of the left hand is not reachable to an area right above the location of the middle section (104) where the right capacitive sensor electrode (107) is mounted.

Similarly, when a right hand is holding the universal handheld controller (101), the hand (e.g., the upper palm and/or a portion of the index finger of the right hand) wraps around the right capacitive sensor electrodes (107), but the left capacitive sensor electrode (105) is significantly further away from the hand than right capacitive sensor electrodes (107). For example, the index finger of the right hand cannot wrap round to reach the portion of the housing that covers the left capacitive sensor electrode (105); and the tip of the index finger of the right hand is not reach closer to an area right above the location of the middle section (104) where the left capacitive sensor electrode (105) is mounted.

The configuration of size, shape and position of the capacitive sensor electrodes (105 and 107) increases and/or maximizes the signal differences measured using the capacitive sensor electrodes (105 and 107); and the signal differences are in opposite directions for the situations when the universal handheld controller (101) is held in opposite hands (left vs. right). Thus, a microcontroller of the capacitive sensor assembly can automatically determine which hand of the user is holding the universal handheld controller (101).

When the universal handheld controller (101) is determined to be held in a left hand, the universal handheld controller (101) can be automatically configured as a left-handed controller. When the universal handheld controller (101) is determined to be held in a right hand, the universal handheld controller (101) can be automatically configured as a right-handed controller.

For example, when the left button (115) of a left-handed controller is used to control a particular function, the right hand button (117) of a right-handed controller is used to control the same function.

For example, when the left LED light (111) of a left-handed controller is used to signal a particular status, the right LED light (113) of a right-handed controller is used to signal the same status.

The handheld controller (101) can include an inertial measurement unit (IMU) to determines it position and motions. For example, the position and motions of the left-handed controller can be used to generate left-handed gestures; and positions and motions of the right-handed controller can be used to generate right-handed gestures.

For example, positions and motions of the left-handed controller can be used to control the left hand of a skeleton model of a user in a virtual reality application, or an augmented/mixed reality application; and positions and motions of the right-handed controller can be used to control the right hand of the skeleton model of the user.

Figure 2:
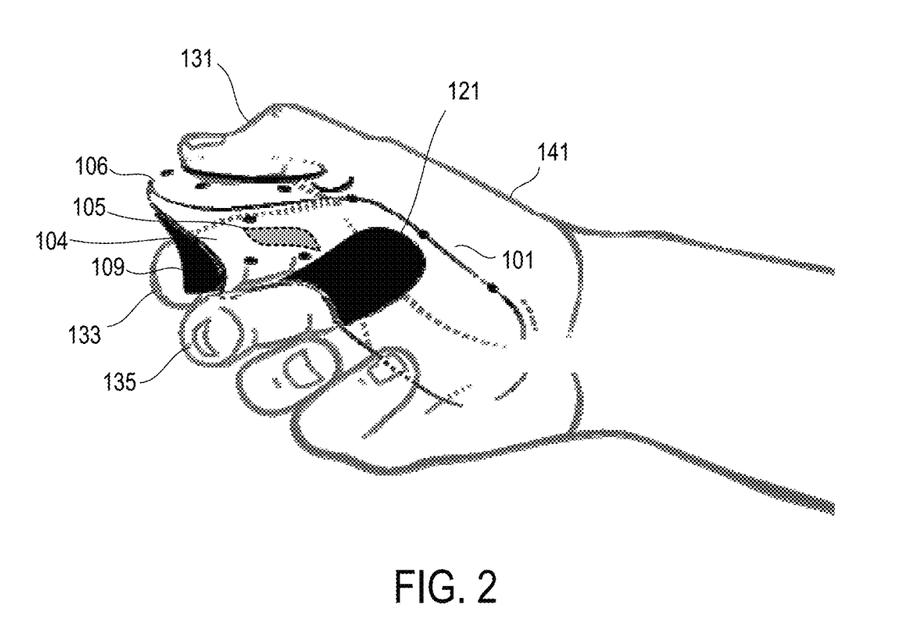
FIG. 2 illustrates the universal handheld controller of FIG. 1 in the right hand of a user.

FIG. 2 illustrates the universal handheld controller (101) of FIG. 1 in the right hand (141) of a user.

As illustrated in FIG. 2, when the universal handheld controller (101) is in the right hand (141), the middle finger (135) of the right hand (141) can wrap around the neck portion (108) to be positioned into the left groove (121) for a secure grip on the universal handheld controller (101).

FIG. 2 illustrates that the universal handheld controller (101) has a trigger button (109) positioned in the front part of the middle section (104) of the head portion (106). The index finger (133) of the right hand (141) can pull or release the trigger button (109) of the universal handheld controller (101). Since the index finger (133) of the right hand is positioned to engage the trigger button (109) at the front of the middle section (104) of the head portion (106), it is away from the left capacitive sensor electrode (105), while the right hand (141) substantially wraps around and covers the right capacitive sensor electrode (105). Such an arrangement can produce a significant signal difference between the left and right capacitive sensor electrode (105) that can be used to infer that the universal handheld controller (101) is being held in the right hand (141) of the user.

Figure 3:
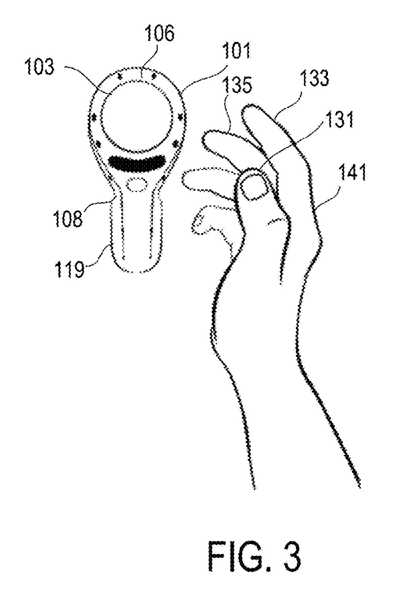
FIGS. 3-6 illustrate the universal handheld controller of FIG. 1 in relation with the right hand of a user.
Figure 4:
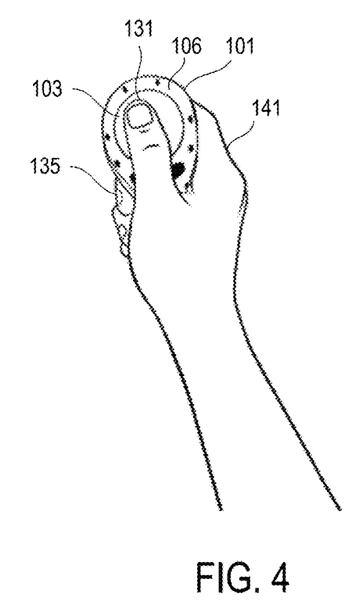
Figure 5:
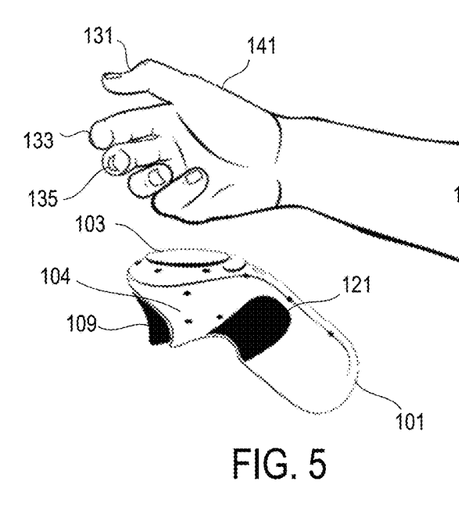
Figure 6:
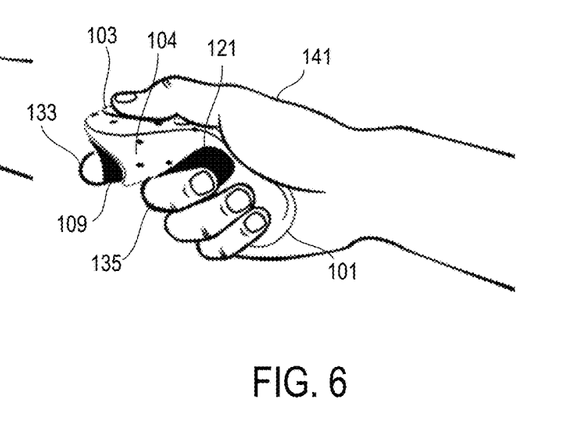

FIGS. 3-6 illustrate the universal handheld controller (101) of FIG. 1 in relation with the right hand (141) of a user. FIGS. 3 and 4 show top views; and FIGS. 5 and 6 show side views from the left. FIGS. 3 and 5 show the universal handheld controller (101) being positioned near the right hand (141); and FIGS. 4 and 6 show the universal handheld controller (101) being held in the right hand (141). FIG. 6 illustrates the index finger (133) on the trigger button (133) and the middle finger (135) in the left groove (121) in the neck portion (108) of the universal handheld controller (101).

Figure 7:
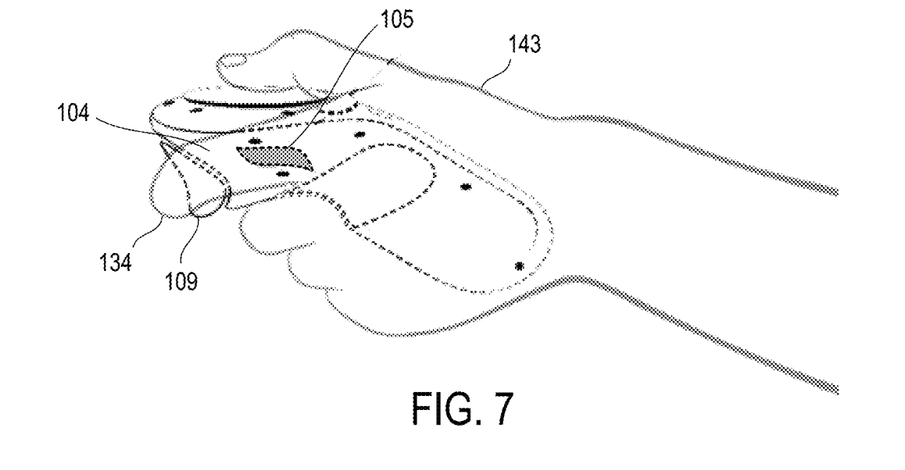
FIG. 7 illustrates the universal handheld controller of FIG. 1 in the left hand of a user.

FIG. 7 illustrates the universal handheld controller of FIG. 1 in the left hand (143) of a user. In FIG. 7, the index finger (134) wraps around the middle section (104) to engage the trigger button (109). Thus, the left capacitive sensor electrode (105) is much closer to any portion of the left hand (143) than the right capacitive sensor electrode (107).

Figure 8:
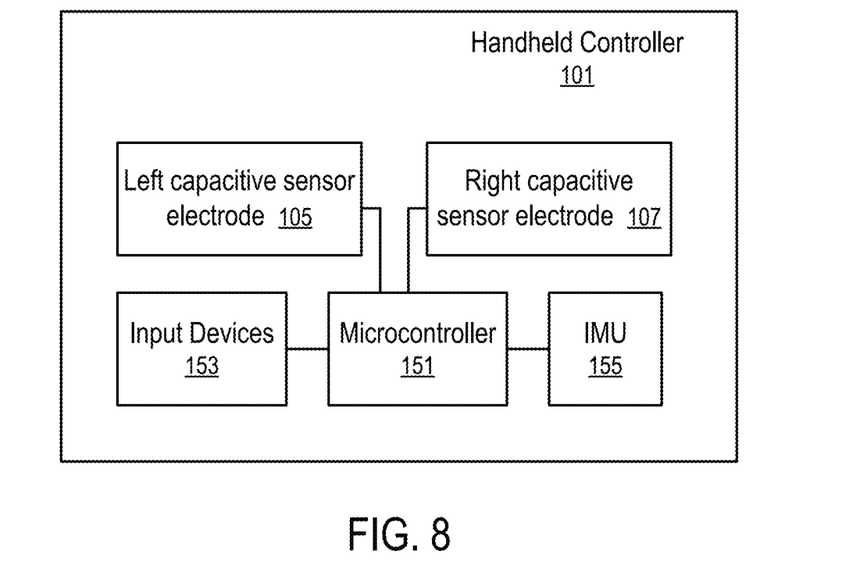
FIG. 8 shows a block diagram of a handheld controller according to one embodiment.

FIG. 8 shows a block diagram of a handheld controller (101) according to one embodiment. For example, the universal handheld controller (101) illustrated in FIGS. 1-7 can be implemented via the block diagram of FIG. 8.

In FIG. 8, the handheld controller (101) includes a left capacitive sensor electrode (105) and a right capacitive sensor electrode (107). The capacitive sensor electrodes (105 and 107) can be sized, shaped and/or positioned in a way as illustrated in FIGS. 1-7.

A microcontroller (151) is configured to determine whether or not the handheld controller (101) is being held in a hand, and/or whether the handheld controller (101) is being held in a left hand (143) ora right hand (141), based on the measurements made using the capacitive sensor electrodes (105 and 107).

For example, when a different between the measurements from the left capacitive sensor electrode (105) and the right capacitive sensor electrode (107) is below a threshold, the microcontroller (151) can reach a conclusion that the handheld controller (101) is not being held in a single hand.

For example, when a measurement from the left capacitive sensor electrode (105) is more than a threshold value larger than a measurement from the right capacitive sensor electrode (107), the microcontroller (151) can determine that the handheld controller (101) is being held in a left hand (143) and thus configure the handheld controller to be right-handed.

For example, when a measurement from the right capacitive sensor electrode (107) is more than the threshold value larger than a measurement from the left capacitive sensor electrode (105), the microcontroller (151) can determine that the handheld controller (101) is being held in a right hand (141) and thus configure the handheld controller to be right-handed.

The handheld controller (101) can have input devices (153), such a touch pad (103), a joystick (e.g., replacing the touch pad (103)), one or more buttons (e.g., 115-117 and/or 109).

Optionally, the handheld controller (101) can include LED lights (e.g., 111 and 113) to provide status indication of the handheld controller (101). Images of the LED lights (e.g., 111 and 113) captured using a camera (e.g., a head-mounted camera, or a camera of a head-mounted display) can be used to identify the handheld controller (101), determine, and/or calibrate the position of the handheld controller (101).

FIGS. 1-8 illustrate a way to use a capacitive sensor assembly having left and right capacitive sensor electrodes (105 and 107) to determine whether a handheld controller (101) is being held in a left hand (143) ora right hand (141). Alternative meanings can also be used to automatically detect whether handheld controller (101) is being held in a left hand (143) or a right hand (141).

For example, left and right touch sensors can be configured on exterior surfaces of the handheld controller (101) such that, when the handheld controller (101) is held in a left hand (143), a left touch sensor is touched by the left hand (143), but the right touch sensor is not touched by the left hand (143). When the handheld controller (101) is held in a right hand (141), the left touch sensor is not touched by the right hand (141), but the right touch sensor is touched by the right hand (141) holding the controller (101).

Similarly, left and right contact pins can be configured on the exterior surfaces of the handheld controller (101) to detect skin contact in a way similar to touch sensors.

Optionally, the handheld controller (101) can have an inertial measurement unit (IMU) (155) to measure the motions of the handheld controller (101) and thus determine its position and/or speed of the handheld controller (101).

In general, uncalibrated measurements of an inertial measurement unit (IMU) can be considered as orientations of the inertial sensor measured relative to an unknown reference coordinate system. A calibration process identifies the unknown reference coordinate system and its relationship with respect to a known coordinate system. After the calibration the measurements of the IMU are relative to the known coordinate system. For example, the calibrated measurements can be an orientation relative to a predetermined orientation in the space, relative to a particular orientation of the sensor device at a specific time instance, relative to the orientation of the arm or hand of a user at a time instance, or relative to a reference orientation/pose of a skeleton model of the user.

For example, calibration parameters of the measurements of the inertial measurement unit can be determined such that the calibrated measurements of the inertial measurement unit are relative to a known orientation, such as the orientation of the sensor device in which the inertial measurement unit is installed, the orientation of the arm or hand of a user to which the sensor device is attached, or the orientation of a skeleton model of the user in a reference pose. A stereo camera integrated in a head mount display (HMD) can be used to capture images of sensor modules on the user. Computer vision techniques and/or artificial neural network techniques can process the captured images identify one or more orientations that can be used to calibrate the measurements of the inertial measurement units in the sensor modules. Some examples and details for the calibration can be found in U.S. patent application Ser. No. 16/044,984, filed Jul. 25, 2018, the entire disclosure of which application is here by incorporated herein by reference.

In general, the kinematics of a user can be modeled using a skeleton model having a set of rigid parts/portions connected by joints. For example, the head, the torso, the left and right upper arms, the left and right forearms, the palms, phalange bones of fingers, metacarpal bones of thumbs, upper legs, lower legs, and feet can be considered as rigid parts that are connected via various joints, such as the neck, shoulders, elbows, wrist, and finger joints.

The movements of the parts in the skeleton model of a user can be controlled by the movements of the corresponding portions of the user tracked using sensor modules. The sensor modules can determine the orientations of the portions of the user, such as the hands, arms, and head of the user. The measured orientations of the corresponding parts of the user determine the orientations of the parts of the skeleton model, such as hands and arms. The relative positions and/or orientations of the rigid parts collectively represent the pose of the user and/or the skeleton model. The skeleton model of the user can be used to control the presentation of an avatar of the user, to identify the gesture inputs of the user, and/or to make a virtual realty or augmented reality presentation of the user.

Figure 9:
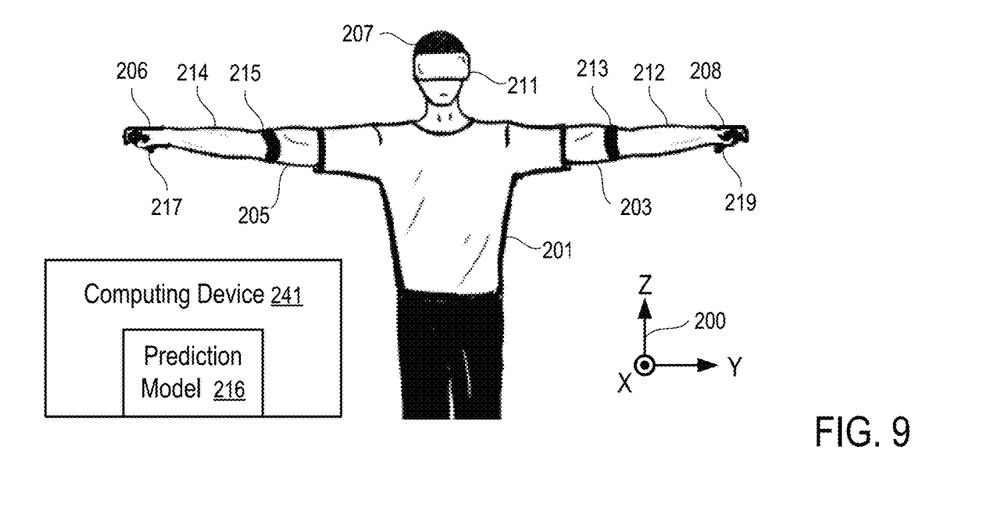
FIG. 9 illustrates a system to track user movements according to one embodiment.

FIG. 9 illustrates a system to track user movements according to one embodiment.

FIG. 9 illustrates various parts of a user, such as the torso (201) of the user, the head (207) of the user, the upper arms (203 and 205) of the user, the forearms (212 and 214) of the user, and the hands (206 and 208) of the user.

In an application illustrated in FIG. 9, the hands (206 and 208) of the user are considered rigid parts movable around the wrists of the user. In other applications, the palms and finger bones of the user can be further tracked for their movements relative to finger joints (e.g., to determine the hand gestures of the user made using relative positions among fingers of a hand and the palm of the hand).

In FIG. 9, the user wears several sensor modules/devices (211, 213, 215, 217 and 219) that track the orientations of parts of the user that are considered, or recognized as, rigid in an application.

In an application illustrated in FIG. 9, rigid parts of the user are movable relative to the torso (201) of the user and relative to each other. Examples of the rigid parts include the head (207), the upper arms (203 and 205), the forearms (212 and 214), and the hands (206 and 208). The joints, such as neck, shoulder, elbow, and/or wrist, connect the rigid parts of the user to form one or more kinematic chains. The kinematic chains can be modeled in a computing device (241) to control the application.

To track the relative positions/orientations of rigid parts in a kinematic chain that connects the rigid parts via one or more joints, a tracking device can be attached to each individual rigid part in the kinematic chain to measure its orientation.

In general, the position and/or orientation of a rigid part in a reference system (200) can be tracked using one of many systems known in the field. Some of the systems may use one or more cameras to take images of a rigid part marked using optical markers and analyze the images to compute the position and/or orientation of the part. Some of the systems may track the rigid part based on signals transmitted from, or received at, a tracking device attached to the rigid part, such as radio frequency signals, infrared signals, ultrasound signals. The signals may correspond to signals received in the tracking device, and/or signals emitted from the tracking device. Some of the systems may use inertial measurement units (IMUs) to track the position and/or orientation of the tracking device.

In FIG. 9, the sensor devices (211, 213, 215, 217 and 219) are used to track some of the rigid parts (e.g., 207, 203, 205, 206, 208) in the one or more kinematic chains, but sensor devices are omitted from other rigid parts (201, 212, 214) in the one or more kinematic chains to reduce the number of sensor devices used and/or to improve user experience for wearing the reduced number of sensor devices.

The computing device (241) can have a prediction model (241) trained to generate predicted measurements of parts (201, 212, 214, 207, 203, 205, 206, and/or 208) of the user based on the measurements of the sensor devices (211, 213, 215, 217 and 219).

For example, the prediction model (241) can be implemented using an artificial neural network (ANN) in the computing device (241) to predict the measurements of the orientations of the rigid parts (201, 212, 214) that have omitted sensor devices, based on the measurements of the orientations rigid parts (207, 203, 205, 206, 208) that have the attached sensor devices (211, 213, 215, 217 and 219).

Further, the artificial neural network can be trained to predict the measurements of the orientations of the rigid parts (207, 203, 205, 206, 208) that would be measured by another system (e.g., an optical tracking system), based on the measurement of the attached sensor devices (211, 213, 215, 217 and 219) that measure orientations using a different technique (e.g., IMUs).

The sensor devices (211, 213, 215, 217, 219) communicate their movement measurements to the computing device (241), which computes or predicts the orientation of the rigid parts (207, 203, 205, 206, 208, 201, 212, 214) by applying the measurements obtained from the attached sensor devices (211, 213, 215, 217 and 219) as inputs to an artificial neural network trained in a way as further discussed below.

In some implementations, each of the sensor devices (211, 213, 215, 217 and 219) communicates its measurements directly to the computing device (241) in a way independent from the operations of other sensor devices.

Alternative, one of the sensor devices (211, 213, 215, 217 and 219) may function as a base unit that receives measurements from one or more other sensor devices and transmit the bundled and/or combined measurements to the computing device (241). In some instances, the artificial neural network is implemented in the base unit and used to generate the predicted measurements that are communicated to the computing device (241).

Preferably, wireless connections made via a personal area wireless network (e.g., Bluetooth connections), or a local area wireless network (e.g., Wi-Fi connections) are used to facilitate the communication from the sensor devices (211, 213, 215, 217 and 219) to the computing device (241).

Alternatively, wired connections can be used to facilitate the communication among some of the sensor devices (211, 213, 215, 217 and 219) and/or with the computing device (241).

For example, a hand module (217 or 219) attached to or held in a corresponding hand (206 or 208) of the user may receive the motion measurements of a corresponding arm module (215 or 213) and transmit the motion measurements of the corresponding hand (206 or 208) and the corresponding upper arm (205 or 203) to the computing device (241).

The hand (206), the forearm (214), and the upper arm (205) can be considered a kinematic chain, for which an artificial neural network can be trained to predict the orientation measurements generated by an optical track system, based on the sensor inputs from the sensor devices (217 and 215) that are attached to the hand (206) and the upper arm (205), without a corresponding device on the forearm (214).

Optionally or in combination, the hand module (e.g., 217) may combine its measurements with the measurements of the corresponding arm module (215) to compute the orientation of the forearm connected between the hand (206) and the upper arm (205), in a way as disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

For example, the hand modules (217 and 219) can be implemented in accordance with FIGS. 1-7 and/or FIG. 8.

For example, the hand modules (217 and 219) and the arm modules (215 and 213) can be each respectively implemented via a base unit (or a game controller) and an arm/shoulder module discussed in U.S. patent application Pub. Ser. No. 15/492,915, filed Apr. 20, 2017 and entitled "Devices for Controlling Computers based on Motions and Positions of Hands", the entire disclosure of which application is hereby incorporated herein by reference.

In some implementations, the head module (211) is configured as a base unit that receives the motion measurements from the hand modules (217 and 219) and the arm modules (215 and 213) and bundles the measurement data for transmission to the computing device (241). In some instances, the computing device (241) is implemented as part of the head module (211). The head module (211) may further determine the orientation of the torso (201) from the orientation of the arm modules (215 and 213) and/or the orientation of the head module (211), using an artificial neural network trained for a corresponding kinematic chain, which includes the upper arms (203 and 205), the torso (201), and/or the head (207).

For the determination of the orientation of the torso (201), the hand modules (217 and 219) are optional in the system illustrated in FIG. 9.

Further, in some instances the head module (211) is not used in the tracking of the orientation of the torso (201) of the user.

Typically, the measurements of the sensor devices (211, 213, 215, 217 and 219) are calibrated for alignment with a common reference system, such as the coordinate system (200).

For example, the coordinate system (200) can correspond to the orientation of the arms and body of the user in a standardized pose illustrated in FIG. 9. When in the pose of FIG. 9, the arms of the user point in the directions that are parallel to the Y axis; the front facing direction of the user is parallel to the X axis; and the legs, the torso (201) to the head (207) are in the direction that is parallel to the Z axis.

After the calibration, the hands, arms (205, 203), the head (207) and the torso (201) of the user may move relative to each other and relative to the coordinate system (200). The measurements of the sensor devices (211, 213, 215, 217 and 219) provide orientations of the hands (206 and 208), the upper arms (205, 203), and the head (207) of the user relative to the coordinate system (200). The computing device (241) computes, estimates, or predicts the current orientation of the torso (201) and/or the forearms (212 and 214) from the current orientations of the upper arms (205, 203), the current orientation the head (207) of the user, and/or the current orientation of the hands (206 and 208) of the user and their orientation history using the prediction model (216).

Some techniques of using an artificial neural network to predict the movements of certain parts in a skeleton model that are not separately tracked using dedicated sensor devices can be found in U.S. patent application Ser. No. 15/996,389, filed Jun. 1, 2018 and entitled "Motion Predictions of Overlapping Kinematic Chains of a Skeleton Model used to Control a Computer System," and U.S. patent application Ser. No. 15/973,237, filed May 7, 2018 and entitled "tracking User Movements to Control a Skeleton Model in a Computer System," the entire disclosures of which applications are hereby incorporated herein by reference.

Optionally or in combination, the computing device (241) may further compute the orientations of the forearms from the orientations of the hands (206 and 208) and upper arms (205 and 203), e.g., using a technique disclosed in U.S. patent application Ser. No. 15/787,555, filed Oct. 18, 2017 and entitled "Tracking Arm Movements to Generate Inputs for Computer Systems", the entire disclosure of which is hereby incorporated herein by reference.

Figure 10:
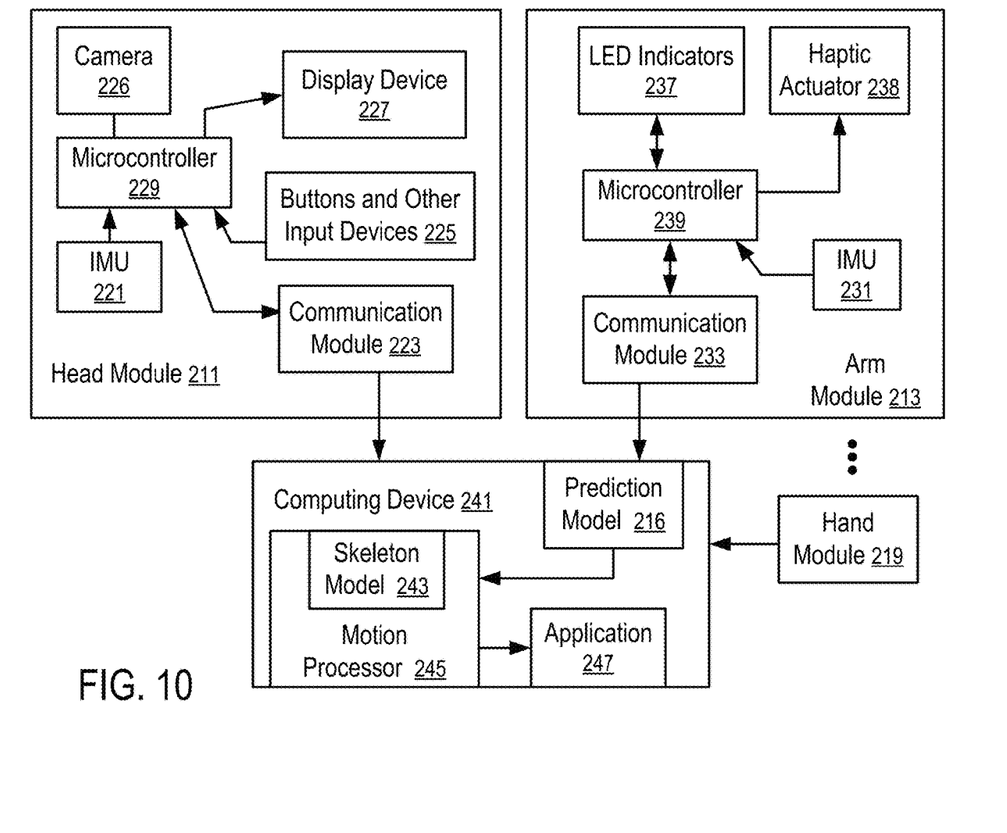
FIG. 10 illustrates a system to control computer operations according to one embodiment.

FIG. 10 illustrates a system to control computer operations according to one embodiment. For example, the system of FIG. 10 can be implemented via attaching the arm modules (215 and 213) to the upper arms (205 and 203) respectively, the head module (211) to the head (207) and/or hand modules (217 and 219), in a way illustrated in FIG. 9.

In FIG. 10, the head module (211) and the arm module (213) have micro-electromechanical system (MEMS) inertial measurement units (IMUs) (221 and 231) that measure motion parameters and determine orientations of the head (207) and the upper arm (203).

Similarly, the hand modules (217 and 219) can also have IMUs. In some applications, the hand modules (217 and 219) measure the orientation of the hands (206 and 208) and the movements of fingers are not separately tracked. In other applications, the hand modules (217 and 219) have separate IMUs for the measurement of the orientations of the palms of the hands (206 and 208), as well as the orientations of at least some phalange bones of at least some fingers on the hands (206 and 208). Examples of hand modules can be found in U.S. patent application Ser. No. 15/792,255, filed Oct. 24, 2017 and entitled "Tracking Finger Movements to Generate Inputs for Computer Systems," the entire disclosure of which is hereby incorporated herein by reference.

Each of the IMUs (231 and 221) has a collection of sensor components that enable the determination of the movement, position and/or orientation of the respective IMU along a number of axes. Examples of the components are: a MEMS accelerometer that measures the projection of acceleration (the difference between the true acceleration of an object and the gravitational acceleration); a MEMS gyroscope that measures angular velocities; and a magnetometer that measures the magnitude and direction of a magnetic field at a certain point in space. In some embodiments, the IMUs use a combination of sensors in three and two axes (e.g., without a magnetometer).

The computing device (241) can have a prediction model (216) and a motion processor (245). The measurements of the IMUs (e.g., 231, 221) from the head module (211), arm modules (e.g., 213 and 215), and/or hand modules (e.g., 217 and 219) are used in the prediction module (216) to generate predicted measurements of at least some of the parts that do not have attached sensor modules, such as the torso (201), and forearms (212 and 214). The predicted measurements and/or the measurements of the IMUs (e.g., 231, 221) are used in the motion processor (245).

The motion processor (245) has a skeleton model (243) of the user (e.g., illustrated FIG. 3). The motion processor (245) controls the movements of the parts of the skeleton model (243) according to the movements/orientations of the corresponding parts of the user. For example, the orientations of the hands (206 and 208), the forearms (212 and 214), the upper arms (203 and 205), the torso (201), the head (207), as measured by the IMUs of the hand modules (217 and 219), the arm modules (213 and 215), the head module (211) sensor modules and/or predicted by the prediction model (216) based on the IMU measurements are used to set the orientations of the corresponding parts of the skeleton model (243).

Since the torso (201) does not have a separately attached sensor module, the movements/orientation of the torso (201) can be predicted using the prediction model (216) using the sensor measurements from sensor modules on a kinematic chain that includes the torso (201). For example, the prediction model (216) can be trained with the motion pattern of a kinematic chain that includes the head (207), the torso (201), and the upper arms (203 and 205) and can be used to predict the orientation of the torso (201) based on the motion history of the head (207), the torso (201), and the upper arms (203 and 205) and the current orientations of the head (207), and the upper arms (203 and 205).

Similarly, since a forearm (212 or 214) does not have a separately attached sensor module, the movements/orientation of the forearm (212 or 214) can be predicted using the prediction model (216) using the sensor measurements from sensor modules on a kinematic chain that includes the forearm (212 or 214). For example, the prediction model (216) can be trained with the motion pattern of a kinematic chain that includes the hand (206), the forearm (214), and the upper arm (205) and can be used to predict the orientation of the forearm (214) based on the motion history of the hand (206), the forearm (214), the upper arm (205) and the current orientations of the hand (206), and the upper arm (205).

The skeleton model (243) is controlled by the motion processor (245) to generate inputs for an application (247) running in the computing device (241). For example, the skeleton model (243) can be used to control the movement of an avatar/model of the arms (212, 214, 205 and 203), the hands (206 and 208), the head (207), and the torso (201) of the user of the computing device (241) in a video game, a virtual reality, a mixed reality, or augmented reality, etc.

Preferably, the arm module (213) has a microcontroller (239) to process the sensor signals from the IMU (231) of the arm module (213) and a communication module (233) to transmit the motion/orientation parameters of the arm module (213) to the computing device (241). Similarly, the head module (211) has a microcontroller (229) to process the sensor signals from the IMU (221) of the head module (211) and a communication module (223) to transmit the motion/orientation parameters of the head module (211) to the computing device (241).

Optionally, the arm module (213) and the head module (211) have LED indicators (237 and 227) respectively to indicate the operating status of the modules (213 and 211).

Optionally, the arm module (213) has a haptic actuator (238) respectively to provide haptic feedback to the user.

Optionally, the head module (211) has a display device (227) and/or buttons and other input devices (225), such as a touch sensor, a microphone, a camera (226), etc.

In some instances, a stereo camera (226) is used to capture stereo images of the sensor devices (213, 215, 217, 219) to calibrate their measurements relative to a common coordinate system, such as the coordinate system (200) defined in connection with a reference pose illustrated in FIG. 9. Further, the LED indicators (e.g., 237) of a sensor module (e.g., 213) can be turned on during the time of capturing the stereo images such that the orientation and/or identity of the sensor module (e.g., 213) can be determined from the locations and/or patterns of the LED indicators.

In some implementations, the head module (211) is replaced with a module that is similar to the arm module (213) and that is attached to the head (207) via a strap or is secured to a head mount display device.

In some applications, the hand module (219) can be implemented with a module that is similar to the arm module (213) and attached to the hand via holding or via a strap. Optionally, the hand module (219) has buttons and other input devices, such as a touch sensor, a joystick, etc.

For example, the handheld modules disclosed in U.S. patent application Ser. No. 15/792,255, filed Oct. 24, 2017 and entitled "Tracking Finger Movements to Generate Inputs for Computer Systems", U.S. patent application Ser. No. 15/787,555, filed Oct. 18, 2017 and entitled "Tracking Arm Movements to Generate Inputs for Computer Systems", and/or U.S. patent application Ser. No. 15/492,915, filed Apr. 20, 2017 and entitled "Devices for Controlling Computers based on Motions and Positions of Hands" can be used to implement the hand modules (217 and 219), the entire disclosures of which applications are hereby incorporated herein by reference.

When a hand module (e.g., 217 or 219) tracks the orientations of the palm and a selected set of phalange bones, the motion pattern of a kinematic chain of the hand captured in the predictive mode (216) can be used in the prediction model (216) to predict the orientations of other phalange bones that do not wear sensor devices.

FIG. 10 shows a hand module (219) and an arm module (213) as examples.

In general, an application for the tracking of the orientation of the torso (201) typically uses two arm modules (213 and 215) as illustrated in FIG. 9. The head module (211) can be used optionally to further improve the tracking of the orientation of the torso (201). Hand modules (217 and 219) can be further used to provide additional inputs and/or for the prediction/calculation of the orientations of the forearms (212 and 214) of the user.

Typically, an IMU (e.g., 231 or 221) in a module (e.g., 213 or 211) generates acceleration data from accelerometers, angular velocity data from gyrometers/gyroscopes, and/or orientation data from magnetometers. The microcontrollers (239 and 229) perform preprocessing tasks, such as filtering the sensor data (e.g., blocking sensors that are not used in a specific application), applying calibration data (e.g., to correct the average accumulated error computed by the computing device (241)), transforming motion/position/orientation data in three axes into a quaternion, and packaging the preprocessed results into data packets (e.g., using a data compression technique) for transmitting to the host computing device (241) with a reduced bandwidth requirement and/or communication time.

Each of the microcontrollers (229, 239) may include a memory storing instructions controlling the operations of the respective microcontroller (229 or 239) to perform primary processing of the sensor data from the IMU (221, 231) and control the operations of the communication module (223, 233), and/or other components, such as the LED indicators (237), the haptic actuator (238), buttons and other input devices (225), the display device (227), etc.

The computing device (241) may include one or more microprocessors and a memory storing instructions to implement the motion processor (245). The motion processor (245) may also be implemented via hardware, such as Application-Specific Integrated Circuit (ASIC) or Field-Programmable Gate Array (FPGA).

In some instances, one of the modules (211, 213, 215, 217, and/or 219) is configured as a primary input device; and the other module is configured as a secondary input device that is connected to the computing device (241) via the primary input device. A secondary input device may use the microprocessor of its connected primary input device to perform some of the preprocessing tasks. A module that communicates directly to the computing device (241) is consider a primary input device, even when the module does not have a secondary input device that is connected to the computing device via the primary input device.

In some instances, the computing device (241) specifies the types of input data requested, and the conditions and/or frequency of the input data; and the modules (211, 213, 215, 217, and/or 219) report the requested input data under the conditions and/or according to the frequency specified by the computing device (241). Different reporting frequencies can be specified for different types of input data (e.g., accelerometer measurements, gyroscope/gyrometer measurements, magnetometer measurements, position, orientation, velocity).

Figure 11:
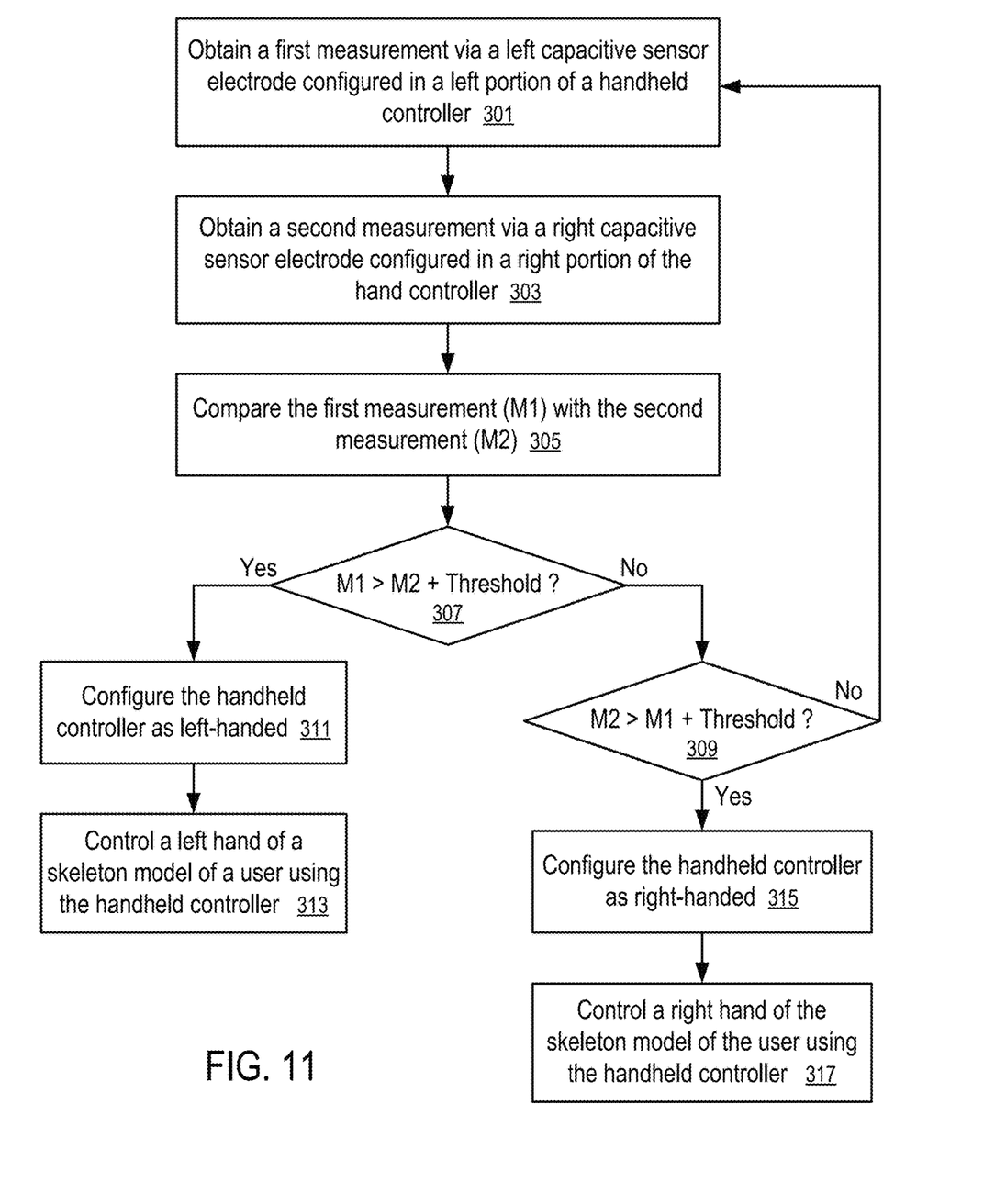
FIG. 11 illustrates a method to control computer operations according to one embodiment.

FIG. 11 illustrates a method to control computer operations according to one embodiment. For example, the method of FIG. 11 can be implemented in the system of FIG. 11 using a handheld controller (101) illustrated in FIGS. 1-7 and/or FIG. 8.

At block 301, a processor obtains a first measurement via a left capacitive sensor electrode (105) configured in a left portion of a handheld controller (101 or 219).

For example, the processor can be a microcontroller (151) of the handheld controller (101) or a computing device (241) in communication with the handheld controller (101).

At block 303, the processor obtains a second measurement via a right capacitive sensor electrode (107) configured in a right portion of the hand controller (101 or 219).

At block 305, the processor compares the first measurement with the second measurement.

At block 307, the processor determines whether the first measurement is a threshold value larger than the second measurement.

At block 311, if the first measurement is a threshold value larger than the second measurement, the processor configures the handheld controller as left-handed.

At block 313, after configuring the handheld controller (101) as left-handed, the processor controls a left hand of a skeleton model (243) of a user using the handheld controller (101 or 219).

At block 309, the processor determines whether the second measurement is a threshold value larger than the first measurement.

At block 315, if the second measurement is a threshold value larger than the first measurement, the processor configures the handheld controller as right-handed.

At block 317, after configuring the handheld controller (101) as right-handed, the processor controls a right hand of the skeleton model (243) of the user using the handheld controller (101 or 219).

If the second measurement is a not threshold value larger than the first measurement and the first measurement is a not threshold value larger than the second measurement, the processor can determine that the handheld controller (101 or 219) is not being held properly by the user. The processor can repeat the operations of blocks 301 to 309 until the user holds the handheld controller (101 or 219) in either the left hand or the right hand. Further, the processor can repeat the operations of blocks 301 to 309 periodically to detect the change of the hand holding the handheld controller (101 or 219).

As illustrated in FIGS. 1-7, the handheld controller (101) can include at least one input device configured to receive user inputs provided via fingers of a hand holding the handheld controller (101).

For example, the input device can be a push button (115, 116, or 117) configured to be controlled by a thumb (131) of the hand (141) holding the handheld controller (101).

For example, the input device can be a touch pad (103) configured to be controlled by the thumb (131) of the hand (141) holding the handheld controller (101).

For example, the input device can be a joystick configured to be controlled by the thumb (131) of the hand holding the handheld controller (101).

For example, the input device can be a trigger button configured to be controlled by an index finger (133) of the hand (141) holding the handheld controller (101).

For example, the handheld controller (101) can include an inertial measurement unit (155) (IMU). The IMU (155) generates motion measurements, which are used by the computing device (241) to control a position and/or posture of the skeleton model (243), including the position of the left hand of the skeleton model (243) or the right hand of the skeleton model (243). The IMU (155) can include a magnetometer, a micro-electromechanical system (MEMS) gyroscope, and/or a MEMS accelerometer.

Preferably, the exterior of the handheld controller (101) is symmetric with respect to left and right, as illustrated in FIGS. 1-7. The left capacitive sensor electrode (105) and the right capacitive sensor electrode (107) are configured to be symmetric with respect to the center plane A-A' of the handheld controller (101).

When the handheld controller (101) is switched from left-handed to right-handed, the operations and functions of the user interface elements can be switched.

For example, the head portion (106) of the handheld controller (101) can have a left button (115) and a right button (117) arranged to be symmetric with respect to the center plane A-A'. When the handheld controller (101) is configured as right-handed, the left button (115) is associated with a first function and the right button associated with a second function (117); and when the handheld controller is configured as left-handed, the left button (115) is associated with the second function and the right button (117) associated with the first function.

For example, the head portion (106) can have a left LED light (111) and a right LED light (113) arranged to be symmetric with respect to the center plan A-A'. When the handheld controller is changed from left-handed to right-handed, usages of the left LED light and the right LED light are switched.

As illustrated in FIGS. 1-7, when the handheld controller (101) is being held in the left hand (143), the left capacitive sensor electrode (105) is closer to the left hand (143) than the right capacitive sensor electrode (107); and when the handheld controller (101) is being held in the right hand (141), the right capacitive sensor electrode (107) is closer to the right hand (141) than the right capacitive sensor electrode (107).

In general, the computing device (241) may be a data processing system, such as a mobile phone, a desktop computer, a laptop computer, a head mount virtual reality display, a personal medial player, a tablet computer, etc.

The present disclosure includes methods and apparatuses which perform these methods, including data processing systems which perform these methods, and computer readable media containing instructions which when executed on data processing systems cause the systems to perform these methods.

For example, the handheld controller (101 or 219), the computing device (241), the arm modules (213, 215) and/or the head module (211) can be implemented using one or more data processing systems.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A handheld controller, comprising:
    at least one input device configured to receive user inputs provided via fingers of a hand holding the handheld controller;
    a left capacitive sensor electrode mounted in a left portion of the handheld device;
    a right capacitive sensor electrode mounted in a right portion of the handheld device; and
    a microcontroller connected to the input device, the left capacitive sensor electrode and the right capacitive sensor electrode, the microcontroller configured to determine whether the hand is a left hand or a right hand based on measurements made via the left capacitive sensor electrode and the right capacitive sensor electrode to adjust functions of a first bottom and a second button based on whether the hand is determined the left hand or the right hand.

2. The handheld controller of claim 1, wherein exterior of the handheld controller is symmetric with respect to left and right.

3. The handheld controller of claim 2, wherein the handheld controller has a center plane; and the left capacitive sensor electrode and the right capacitive sensor electrode are symmetric with respect to the center plane.

4. The handheld controller of claim 3, further comprising:
    a housing, wherein the left capacitive sensor electrode, the right capacitive sensor electrode, and the microcontroller are mounted within the housing.

5. The handheld controller of claim 3, wherein when a measurement made via the left capacitive sensor electrode is a threshold value larger than a measurement made via the right capacitive sensor electrode, the microcontroller configures the handheld controller as a left-handed controller; and when a measurement made via the right capacitive sensor electrode is the threshold value larger than a measurement made via the left capacitive sensor electrode, the microcontroller configures the handheld controller as a right-handed controller.

6. The handheld controller of claim 5, further comprising:
    a head portion having the left button and the right button arranged to be symmetric with respect to the center plane, wherein when the handheld controller is configured as right-handed, the left button is associated with a first function and the right button associated with a second function; and
    when the handheld controller is configured as left-handed, the left button is associated with the second function and the right button associated with the first function.

7. The handheld controller of claim 6, wherein the head portion further has a left LED light and a right LED light arranged to be symmetric with respect to the center plan; and wherein when the handheld controller is changed from left-handed to right-handed, usages of the left LED light and the right LED light are switched.

8. The handheld controller of claim 7, wherein the head portion further has a touch pad or a joystick configured to be controlled by a thumb of the hand holding the hand controller.

9. The handheld controller of claim 6, further comprising:
    a neck portion having a left groove and a right groove, wherein the left groove or the right groove is configured to accommodate a middle finger of the hand holding the handheld controller for a secure grip.

10. The handheld controller of claim 9, wherein the head portion has a middle section between a top surface of the head portion and the neck portion;
    and the left capacitive sensor electrode and the right capacitive sensor electrode are mounted within the middle section.

11. The handheld controller of claim 10, wherein when the handheld controller is being held in the left hand, the left capacitive sensor electrode is closer to the left hand than the right capacitive sensor electrode; and when the handheld controller is being held in the right hand, the right capacitive sensor electrode is closer to the right hand than the right capacitive sensor electrode.

12. A method, comprising:
    obtaining a first measurement via a left capacitive sensor electrode configured in a left portion of a handheld controller;
    obtaining a second measurement via a right capacitive sensor electrode configured in a right portion of the hand controller;
    comparing the first measurement made via the left capacitive sensor electrode with the second measurement made via the right capacitive sensor electrode; and
    determining whether the handheld controller is being held in a left hand of a user or a right hand of the user, based on a result of the comparing of the first measurement made via the left capacitive sensor electrode with the second measurement made via the right capacitive sensor electrode to adjust functions of a first bottom and a second button based on whether the handheld controller is determined to be held in the left hand of the user or the right hand of the user.

13. The method of claim 12, further comprising:
    configuring the handheld controller as left-handed when the handheld controller is being held in the left hand; and
    configuring the handheld controller as right-handed when the handheld controller is being held in the right hand.

14. The method of claim 12, further comprising:
    in response to a determination that the first measurement is a threshold value larger than the second measurement, configuring the handheld controller as left-handed.

15. The method of claim 14, further comprising:
    in response to a determination that the first measurement is the threshold value smaller than the second measurement, configuring the handheld controller as right-handed.

16. The method of claim 12, further comprising:
    selectively associating the handheld controller with either a left hand of a skeleton model of the user or a right hand of the skeleton model of the user, based on a determination of whether the handheld controller is being held in the left hand of the user or the right hand of the user.

17. A system, comprising:
    a computer having a skeleton model of a user; and
    a handheld controller configured to be in communication with the computer, comprising:
        at least one input device configured to receive inputs from the user;
        a left capacitive sensor electrode;

a right capacitive sensor electrode; and a microcontroller coupled to the input device, the left capacitive sensor electrode, and the right capacitive sensor electrode;

wherein the system is configured to:

determine whether the handheld controller is being held in a left hand of the user or a right hand of the user, based on comparing measurements made via the left capacitive sensor electrode and the right capacitive sensor electrode to adjust functions of a first bottom and a second button based on whether the handheld controller is determined to be held in the left hand of the user or the right hand of the user;

associate the handheld controller with a left hand of the skeleton model or a right hand of the skeleton model respectively based on a determination that the handheld controller is being held by the left hand of the user or the right hand of the user; and control the skeleton model in the computer according to signals from the handheld controller.

18. The system of claim 17, wherein the handheld controller further comprises:

an inertial measurement unit configured to generate motion measurements, wherein the system is configured to control a position of a left hand of the skeleton model or a right hand of the skeleton model based on the motion measurements.

19. The system of claim 18, wherein the one input device is one of:

a button configured to be controlled by a thumb of the hand holding the handheld controller;

a touch pad configured to be controlled by the thumb of the hand holding the handheld controller;

a joystick configured to be controlled by the thumb of the hand holding the handheld controller; and a button configured to be controlled by an index finger of the hand holding the handheld controller.

20. The system of claim 19, wherein the inertial measurement unit includes at least one of: a magnetometer, a micro-electromechanical system (MEMS) gyroscope, and a MEMS accelerometer.

* * * * *